(12) United States Patent
Palmas et al.

(10) Patent No.: US 7,094,380 B1
(45) Date of Patent: Aug. 22, 2006

(54) DISTRIBUTION APPARATUS FOR SHORT TIME CONTACT OF HYDROCARBON COMPOUNDS WITH PARTICLES

(75) Inventors: Paolo Palmas, Des Plaines, IL (US); Lawrence A. Lacijan, Palatine, IL (US); Adam S. Kasle, LaGrange, IL (US)

(73) Assignee: UOP LLC, Des Plaines, IL (US)

(*) Notice: Subject to any disclaimer, the term of this patent is extended or adjusted under 35 U.S.C. 154(b) by 470 days.

(21) Appl. No.: 10/384,871

(22) Filed: Mar. 7, 2003

(51) Int. Cl.
*B01J 8/18* (2006.01)
*C10G 35/10* (2006.01)

(52) U.S. Cl. .................... 422/140; 422/139; 422/142

(58) Field of Classification Search ............... 422/139, 422/140, 142
See application file for complete search history.

(56) References Cited

U.S. PATENT DOCUMENTS

| | | | |
|---|---|---|---|
| 3,071,540 A | 1/1963 | McMahon et al. | 208/163 |
| 4,434,049 A | 2/1984 | Dean et al. | 208/153 |
| 4,717,467 A | 1/1988 | Haddad et al. | 208/113 |
| 4,985,136 A | 1/1991 | Bartholic | 208/153 |
| 5,108,583 A | 4/1992 | Keon | 208/157 |
| 5,296,131 A | 3/1994 | Raterman | 208/113 |
| 6,010,620 A | 1/2000 | Myers et al. | 208/146 |
| 6,143,253 A * | 11/2000 | Radcliffe et al. | 422/145 |
| 6,156,276 A * | 12/2000 | Myers et al. | 422/140 |
| 6,165,353 A * | 12/2000 | Carpenter et al. | 208/146 |
| 6,503,461 B1 | 1/2003 | Burgard et al. | 422/145 |
| 6,698,617 B1 * | 3/2004 | Szymanski | 222/1 |

\* cited by examiner

*Primary Examiner*—N. Bhat
(74) *Attorney, Agent, or Firm*—John G. Tolomei; James C. Paschall

(57) ABSTRACT

Disclosed is an apparatus for injecting a plurality of uniform jets into an extended dispersion of moving catalyst particles within a reactor vessel. The apparatus comprises a plurality of outer conduits each for carrying contacting fluid and being fixed to a respective opening in a first tube sheet. A plurality of outlet nozzles are each fixed to a respective opening in a second tube sheet which is fixed to the first tube sheet. Feed in the outer conduits are delivered to the outlet nozzles for distribution into the vessel. All of the outlet nozzles can be easily replaced by breaking the fixation between the two tube sheets and securing a new second tube sheet with outlet nozzles to the first tube sheet.

9 Claims, 4 Drawing Sheets

DISTRIBUTION APPARATUS FOR SHORT TIME CONTACT OF HYDROCARBON COMPOUNDS WITH PARTICLES

BACKGROUND OF THE INVENTION

This invention relates to an apparatus for dispersing liquids into fluidized solids. More specifically, this invention relates to an apparatus for dispersing several streams of hydrocarbon feed into a stream of fluidized catalyst particles which apparatus can be easily replaced and a method for doing the same.

DESCRIPTION OF THE PRIOR ART

There are a number of continuous cyclical processes employing fluidized solid techniques in which an at least partially liquid phase stream containing hydrocarbon compounds contacts the fluidized solids in a contacting zone and carbonaceous or other fouling materials are deposited on the solids. The solids are conveyed during the course of the cycle to another zone where foulants are removed in a rejuvenation section or, more specifically, in most cases, carbon deposits are at least partially removed by combustion in an oxygen-containing medium. The solids from the rejuvenation section are subsequently withdrawn and reintroduced in whole or in part to the contacting zone.

One of the more important processes of this nature is the fluid catalytic cracking (FCC) process for the conversion of relatively high-boiling hydrocarbons to lighter hydrocarbons. The hydrocarbon feed is contacted in one or more reaction zones with the particulate cracking catalyst maintained in a fluidized state under conditions suitable for the conversion of hydrocarbons.

It has been a long recognized objective in the FCC process to maximize the dispersal of the hydrocarbon feed into the particulate catalyst suspension. Dividing the feed into small droplets improves dispersion of the feed by increasing the interaction between the liquid and solids. Preferably, the droplet sizes become small enough to permit vaporization of the liquid before it contacts the solids. It is well known that agitation or shearing can atomize a liquid hydrocarbon feed into fine droplets which are then directed at the fluidized solid particles. A variety of methods are known for shearing such liquid streams into fine droplets. U.S. Pat. No. 3,071,540; U.S. Pat. No. 4,434,049; U.S. Pat. No. 4,717,467 and U.S. Pat. No. 5,108,583 are examples.

The processing of increasingly heavier feeds in FCC type processes and the tendency of such feeds to elevate coke production and yield undesirable products has led to new methods of contacting feeds with catalyst. Of particular recent interest have been methods of contacting FCC catalyst for very short contact periods. U.S. Pat. No. 4,985,136; U.S. Pat. No. 5,296,131; U.S. Pat. No. 6,010,620 and U.S. Pat. No. 6,165,353 are examples.

The type of injection desired for short contact time arrangements poses special problems for the injection of the feed into the catalyst. Most desirably, the feed is injected in an array of identical feed injection streams that uniformly contact a stream of catalyst flowing in a compatible pattern. Typically, the uniform array of feed injection nozzles is arranged to provide a plurality of discrete jets that extend horizontally and shoot the feed into a thin band of catalyst that falls in a direction at least partially transverse to the flow of jets. Consequently, several feed injection nozzles are arrayed closely together. The arrangement usually creates a vertical line of catalyst that is contacted by an array of feed jets that extends over a horizontal line. In turn, the nozzles that create the jets must be located close to the band of catalyst, thereby subjecting the feed injection nozzles to erosive effects. The nozzles of the feed injectors are the most prone to erosion because they extend farthest into the reactor and closest to the band of catalyst.

Replacing feed injectors nozzles that are grouped in an array requires a shut down of the reactor and pulling the entire feed injector assembly from the reactor. Each individual nozzle that must be replaced must be cut from the assembly and a new nozzle welded onto the appropriate injector. Typically, most or all of the nozzles will be replaced to take full advantage of the reactor shut down, thereby reducing the frequency of reactor shut downs. Welding the new nozzle onto the injector is labor intensive because adjacent nozzles in the array block access to the seam to be welded. U.S. Pat. No. 6,503,461 B1 provides an easier way of replacing feed injectors that are not clustered together.

SUMMARY OF THE INVENTION

An object of this invention is to provide an apparatus and method that facilitates replacement of nozzles from an array of feed injectors.

The invention comprises an apparatus for injecting a plurality of uniform jets into an extended dispersion of moving catalyst particles within a reactor vessel. The apparatus comprises a plurality of outer conduits each for carrying contacting fluid and being fixed to a respective opening in a first tube sheet. A plurality of outlet nozzles are each fixed to a respective opening in a second tube sheet which is fixed to the first tube sheet. Feed in the outer conduits are delivered to the outlet nozzles for distribution into the vessel. All of the outlet nozzles can be easily replaced by breaking the fixation between the two tube sheets and securing a new second tube sheet with outlet nozzles to the first tube sheet.

Additional objects, embodiments, and details of this invention can be obtained from the following detailed description.

DETAILED DESCRIPTION OF THE INVENTION

Figure 1:
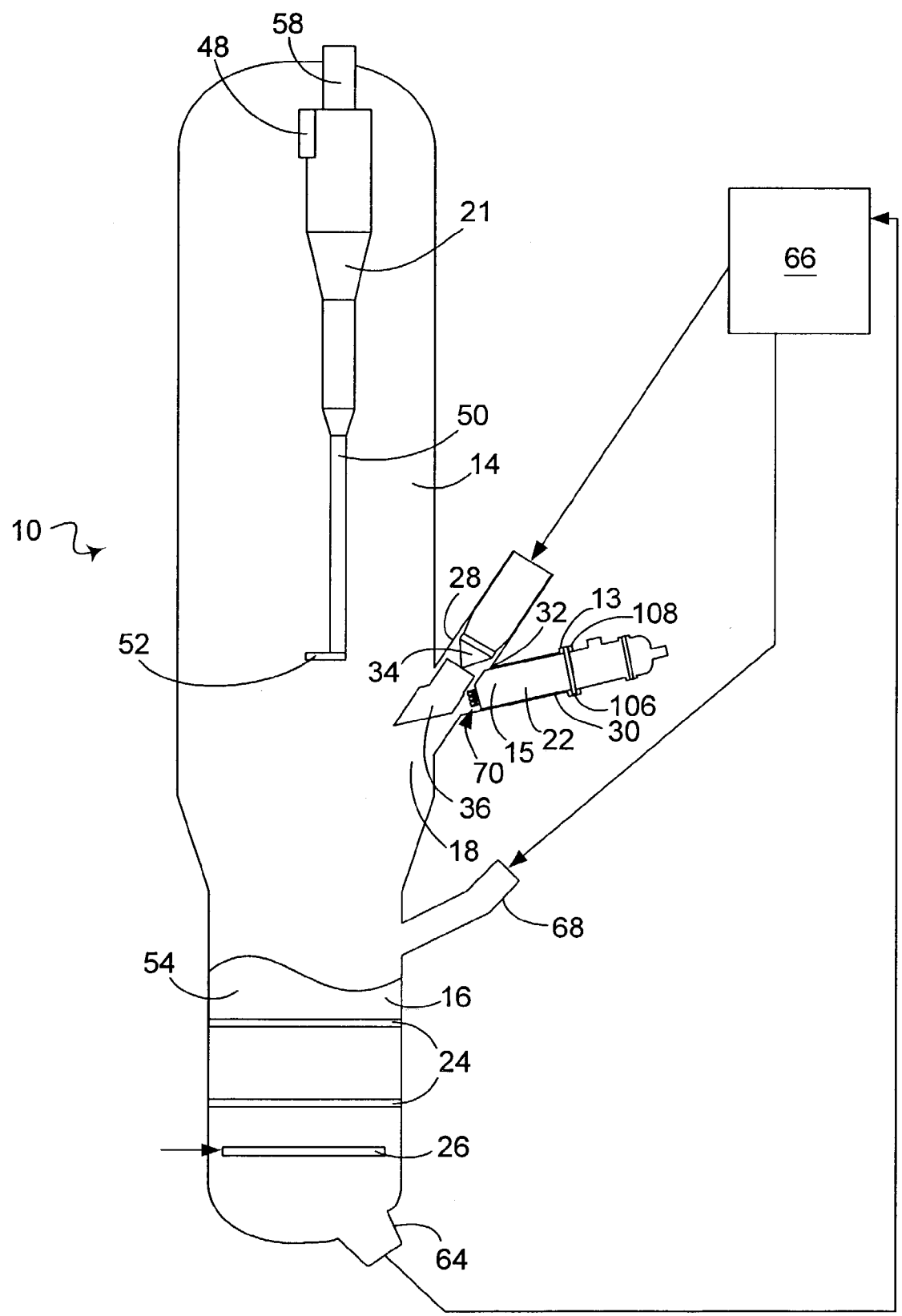
FIG. 1 is a schematic illustration of a short contact time FCC reactor arrangement that uses the distributor and method of this invention.

This invention is more fully explained in the context of an FCC apparatus. FIG. 1 shows an FCC apparatus that is arranged in accordance with this invention. The description of this invention in the context of the specifically disclosed apparatus and arrangement is not meant to limit it to the details disclosed therein. The FCC arrangement shown in FIG. 1 consists of a reactor 10 that includes a separating region 14, a collection region 16 and a contacting region 18. The separating region 14 includes a separator such as a cyclone 21. The collection region 16 may include a series of trays 24 and a distributor 26 for the distribution of stripping media. The contacting region 18 comprises a catalyst inlet nozzle 28 and a feed distributor nozzle 30. The arrangement circulates catalyst and contacts feed in the manner hereinafter described.

Fresh regenerated catalyst, spent catalyst, or a mixture thereof enters the reactor 10 through the catalyst inlet nozzle 28 which typically communicates with the end of a catalyst conduit (not shown). The feed distributor nozzle 30 and the catalyst inlet nozzle 28 join at a joint 32. Hydrocarbon feed is injected into the contacting region 18 through the feed distributor nozzle 30 by a distributor 15. The distributor 15 includes a shroud 22 and a distributor head 70 that atomizes the feed into several streams of fine liquid droplets. The streams provide a linear array of feed that transversely contacts a stream of catalyst falling from the catalyst inlet nozzle 28. The catalyst inlet nozzle 28 contains a funnel 34 fixed to the inside wall of the catalyst inlet nozzle 28. The funnel 34 dispenses catalyst through an opening (not shown) to form the catalyst into a curtain or other configuration that falls into a catalyst chute 36. The array of feed injected by the distributor 15 contacts the falling curtain of catalyst in the catalyst chute 36.

The feed from the distributor 15 preferably contacts the falling catalyst in a transverse direction to obtain a quick contacting between the feed and the catalyst particles. The distributor 15 will produce a spray pattern that is compatible with the configuration of the catalyst stream. Where the discharge point forms a falling curtain of catalyst, the distributor 15 will produce a radial pattern of flow that passes outwardly to contact the catalyst. Where the falling curtain has a linear shape, the feed injector will generally produce a horizontal pattern of atomized liquid. When contacting the falling curtain of catalyst, the feed will typically have a velocity of greater than 3.1 m/sec (10 ft/sec) and may have a velocity of 9.1 m/sec (30 ft/sec) or more. Conventional temperatures for the feed are in the range of from 149° to 316° C. (300° to 600° F.).

Contact of the feed with the catalyst causes a rapid vaporization and a high velocity discharge of catalyst into the reactor 10. Contact between the feed and catalyst produces a vaporous hydrocarbon product while carbon is deposited or "coked" on the catalyst. Catalyst disengages from the product vapor and falls into a dense bed of catalyst 54 in the collection region 16. Vaporous product ascends into the separating region 14 of the reactor 10.

The separator, typically comprising the cyclone 21, pulls vapor product and entrained catalyst through an inlet 48 in the cyclone 21. The cyclone 21 further separates the entrained catalyst from the product vapor. The product vapor with trace amounts of entrained catalyst exits the cyclone 21 through an outlet conduit 58 which carries the effluent stream out of the reactor 10 for further processing. The entrained catalyst falls by gravity through a dipleg 50 and out through a valve 52, such as a counter-weighted flapper valve, into the dense bed of catalyst 54 in the collection region 16. The invention also contemplates use of a cyclone external to the reactor 10.

The collection region 16 may serve as a stripping zone for the recovery of entrained and adsorbed hydrocarbons from catalyst entering the collection region 16. Stripping gas enters the collection region 16 through the distributor 26. A dispersed stripping gas, such as steam, rises upwardly through the catalyst. The series of trays 24 may provide redistribution of the stripping medium and stripped hydrocarbons as they pass upwardly through the bed 54. A nozzle 64 withdraws the stripped catalyst for regeneration in a regenerator vessel 66 and/or recycle to the catalyst inlet nozzle 28 for recontacting of catalyst with the feed. The optional addition of hot regenerated catalyst to the bed 54 through a conduit 68 can facilitate stripping by raising the temperature in the collection region 16. The stripping medium as well as the stripped vapor hydrocarbon product will ordinarily rise and combine with the disengaged vapor hydrocarbon product and are eventually drawn into the inlet 48 of the cyclone 21.

A blind flange 106 retains the shroud 22 and can be used as an integral part of the shroud. Bolting the blind flange 106 to an open flange 13 on the feed distributor nozzle 30 of the reactor 10 facilitates insertion and removal of the distributor 15. The open flange 13 on the outside of the feed distributor nozzle 30 and a flange 108 work together to sandwich the blind flange 106 into position in the feed distributor nozzle 30. Bolting of the flange 108 into position on the open flange 13 positions the shroud 22 at the desired location within the reactor 10.

The catalyst used in the reactor 10 can include any of the well-known catalysts that are used in the art of fluidized catalytic cracking. These compositions include amorphous-clay type catalysts which have, for the most part, been replaced by high activity, crystalline alumina silica or zeolite-containing catalysts. Zeolite-containing catalysts are preferred over amorphous-type catalysts because of their higher intrinsic activity and their higher resistance to the deactivating effects of high temperature exposure to steam and exposure to the metals contained in most feedstocks. Zeolites are the most commonly used crystalline alumina silicates and are usually dispersed in a porous inorganic carrier material such as silica, alumina, or zirconium. These catalyst compositions may have a zeolite content of 30% or more. Zeolite catalysts used in the process of this invention will preferably have a zeolite content of from 25 to 80 wt-% of the catalyst. The zeolites may also be stabilized with rare earth elements and contain from 0.1 to 10 wt-% of rare earths.

Suitable liquid media for this invention include any liquid stream that will enter the distributor as a liquid and may be mixed with a gas. For the FCC process, feedstocks suitable for processing by the method of this invention, include conventional FCC feeds and higher boiling or residual feeds. The most common of the conventional feeds is a vacuum gas oil which is typically a hydrocarbon material having a boiling range of from 343° to 552° C. (650° to 1025° F.) and is prepared by vacuum fractionation of atmospheric residue. These fractions are generally low in coke precursors and heavy metals which can deactivate the catalyst. Heavy or residual feeds, i.e., boiling above 499° C. (930° F.) and which have a high metals content, are finding increased usage in FCC units.

Figure 2:
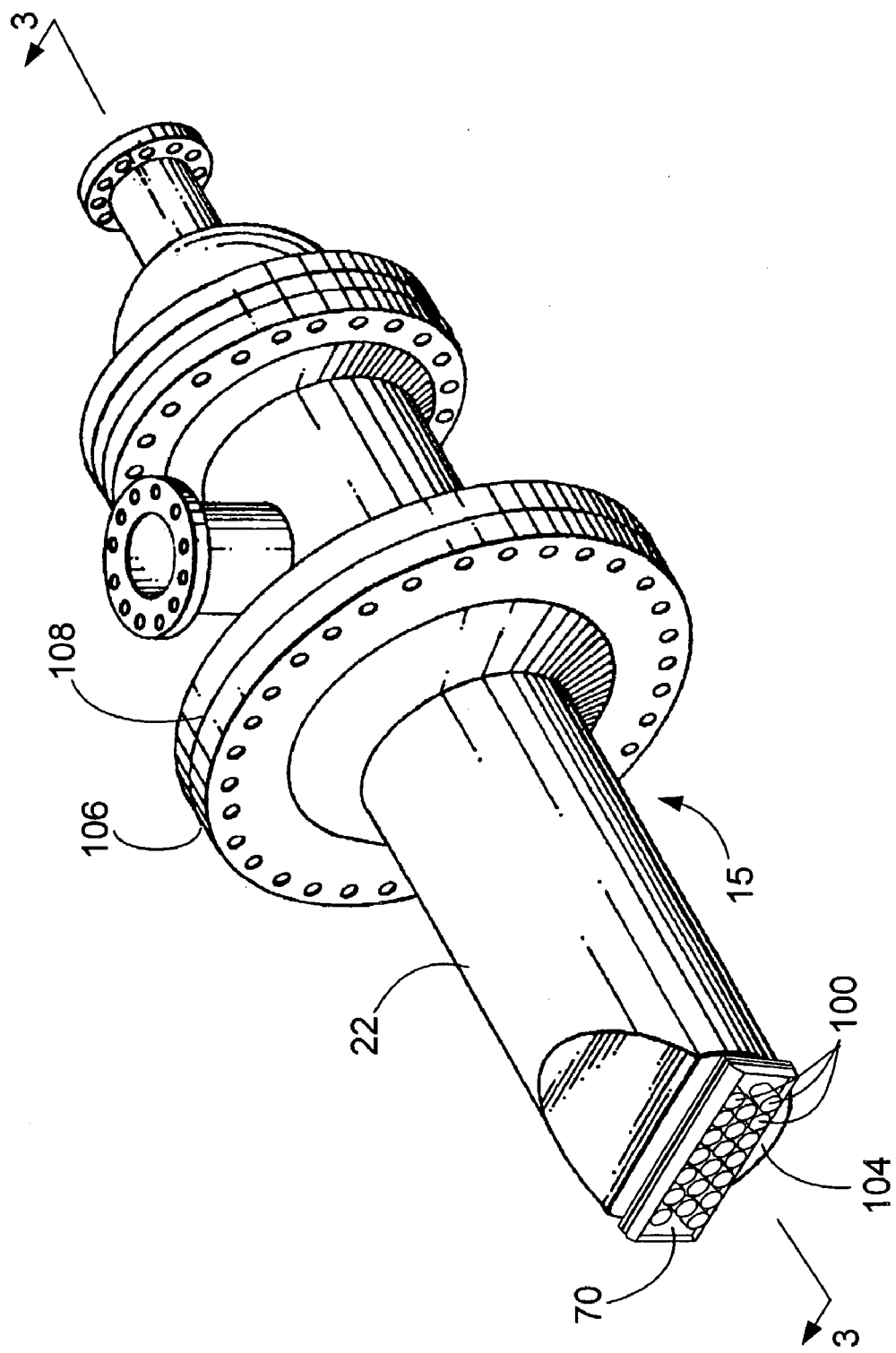
FIG. 2 is an isometric view of the distributor of this invention depicted in FIG. 1.

FIG. 2 shows a preferred outer arrangement for the distributor 15. As shown in FIG. 2, the distributor head 70 is supported in front of an outer face 104 on the outer end of the shroud 22. Flanges 106, 108 are also shown in FIG. 2. The distributor head 70 of the distributor 15 includes nozzles 100 with openings typically sized to provide a fluid velocity in a range of from 3 to 122 m/sec (10 to 400 ft/s) and preferably in the range of 15 to 91 m/sec (50 to 300 ft/s). In accordance with typical FCC practice, the feed exits openings in the nozzles 100 as a spray. Droplet size within the spray and the velocity of the spray determines momentum of the feed as it enters the interior of the reactor. It is difficult to increase the momentum of the feed above a given level since the velocity of the feed injection is inversely proportional to the size of the droplets in the emanating spray. Higher velocities for the spray tend to directly increase the momentum of the spray but indirectly decrease the momentum by reducing the size of the exiting droplets. Conversely, the reduced momentum that results directly from lower spray velocities is offset by the typical production of larger droplets. In the preferred practice of this invention in which the feed comprises substantially liquid oil, lower jet velocities are preferred.

The dispersion of the feed into yet finer droplets is promoted by imparting sufficient energy into the liquid. Where desired any of the prior art methods may be used in combination with the feed injection arrangement of this invention. In some cases, this invention will be practiced with some addition of a gaseous diluent such as steam to the feed before discharge through the orifices. The addition of the gaseous material can aid in the atomization of the feed. In some cases a minimum quantity of gaseous material, equal to about 0.2 wt-% of the combined liquid and gaseous mixture, may be commingled with the liquid before its discharge through the nozzles. Typically the quantity of any added steam is 5 wt-% or less of the combined gaseous and liquid mixture. The liquid or feed entering the distributor 15 will usually have a temperature below its initial boiling point but a temperature above the boiling point of any steam or gaseous medium that enters the distributor 15 along with the liquid.

Figure 3:
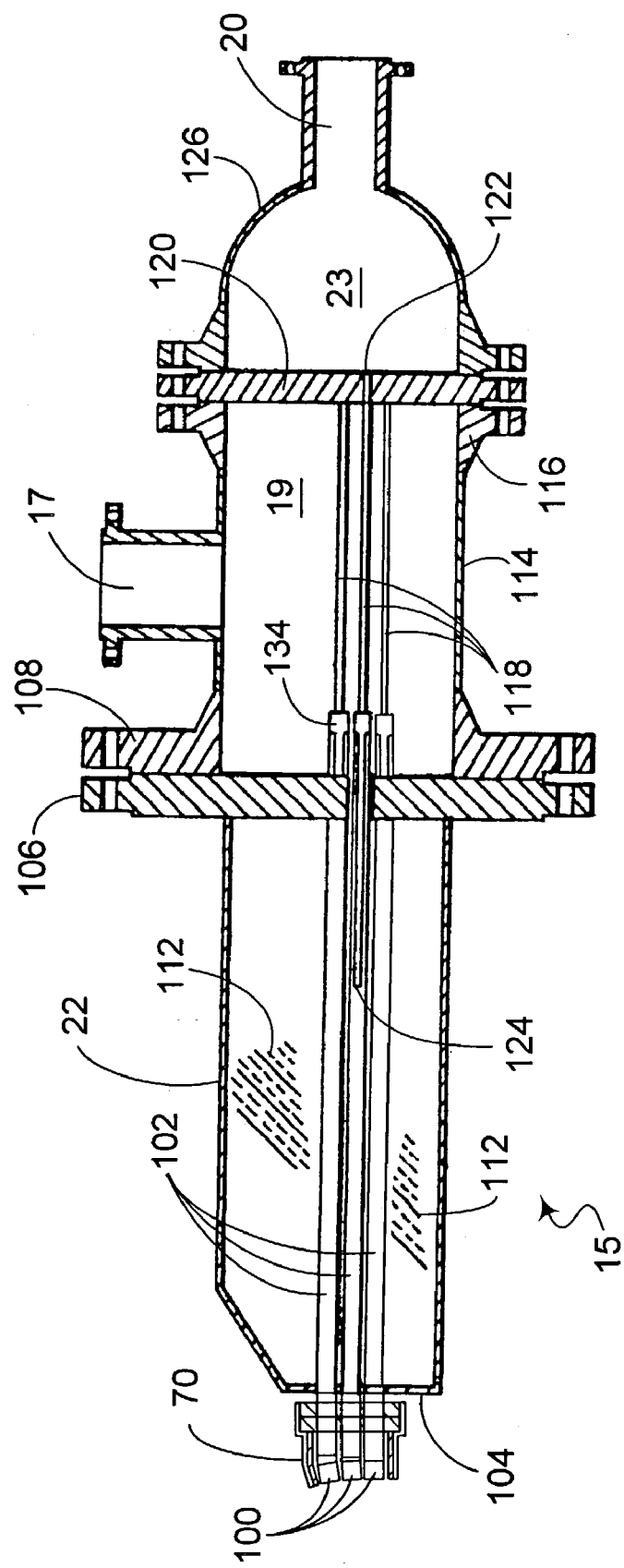
FIG. 3 is a sectional view of the distributor of FIG. 2 taken across segments 3—3.

FIG. 3 shows outer conduits 102 in fluid communication with respective nozzles 100 of the distributor head 70. The blind flange 106 provides support to both ends of the outer conduits 102. The blind flange 106 fixes both the inner end of the shroud 22 and inner ends of the outer conduits 102. At a location proximate to the nozzles 100, outer ends of the outer conduits 102 receive support from the blind flange 106 through the outer face 104 of the shroud 22 to inhibit vibration and displacement of the outer ends of the outer conduits 102 within the reactor 10 (FIG. 1).

The shroud 22 may have a generally cylindrical shape or any shape that suits the location into which it is inserted and provides adequate stiffness to guide the otherwise unsupported ends of the outer conduits 102. However, the shroud 22 may be an open structure that provides sufficient rigidity to prevent vibration or damage to the outer conduits 102. Preferably, the shroud 22 is essentially closed to maximize protection and support of the conduits. The cylindrical shape is preferred since it also accommodates location of the distributor into a traditional pressure vessel as well as a nozzle of an FCC standpipe which may provide the location for shaping of the catalyst flow. The interior of the shroud 22 may be filled with an insulating material 112 such as fibrous blanket insulation or refractor lining materials to reduce the temperature within the shroud.

Depending upon the location of the shroud, additional abrasion-resistant linings may be provided on the outside to protect it from erosion. Although the flow of catalyst into which the nozzles 100 inject the dispersed fluid is spaced away from the nozzles 100 so as to avoid direct erosion under ordinary circumstances, erosion from catalyst may still affect the nozzles 100 of the distributor 15. Hence, use of erosion-resistant metals that are well known to those skilled in the art may be advantageous.

FIGS. 2 and 3 show the nozzles disposed in a linear array. The nozzles 100 are arranged above and below a center line of the linear array which may be offset from the parallel center line of the cylindrical outline of the shroud 22 in upper, middle and lower rows. The nozzles are spaced to provide a broad band of linear feed contacting in a desired flow pattern. The nozzles 100 may be designed to provide any desired flow pattern of dispersed and atomized liquid out of each nozzle. The nozzles 100 may have an outlet configuration that provides a concentrated cylindrical jet or may be arranged to provide fan shaped patterns to increase the vertical distance over which the dispersed liquid contacts the dispersion of moving catalyst particles.

At the inner end of the shroud 22, the flange 108 forms part of a chamber wall 114 that together with a flange 116 and blind flanges 106, 120 define a chamber 19. The chamber 19 may be used for the distribution of hydrocarbon feed or gaseous phase fluids fed from a nozzle 17. In an embodiment, liquid hydrocarbon feed is delivered to the chamber 19. Fluid from the chamber 19 flows into annular areas defined, at least in part, between inner conduits 118 and the inner diameter of the outer conduits 102. The blind flange 120 retains inlet ends of the inner conduits 118 that, like the outer conduits 102, can be formed from tubing or piping.

The inner conduits 118 have inlets 122 that communicate with a chamber 23. A flanged end closure 126 retains a nozzle 20 and together with the blind flange 120 defines the chamber 23. The chamber 23 again may receive either hydrocarbon feed or a gaseous phase fluid. In an embodiment, a diluent such as steam is delivered to the chamber 23. At the location of the blind flange 106, the inner conduits 118 enter the outer conduits 102, in a preferred coaxial alignment, and extend along a linear path through the outer conduit 102. An outlet 124 of the inner conduit 118 discharges a fluid into the outer conduit 102. Fluid from the inner conduit 118 initially enters the outer conduit 102 as a linearly directed flow stream. The fluid streams begin to mix as fluid from the inner conduit 118 enters the outer conduit 102 from the outlet 124 and continue to mix as they pass to one of the nozzles 100. The diameter and length of the outer conduits 102 are sized to provide sufficient time for blending of the gas and liquid stream before exiting the nozzles 100. The open length of the outer conduit 102 downstream of the outlet 124 may be adjusted as necessary to provide the desired amount of mixing. The outlet 124 of the inner conduit 118 may be positioned closer to or farther from the nozzles 100 to reduce or increase the amount of mixing in the outer conduit 102. Inlet ends 134 of the outer conduits 102 may be extended into the chamber 19 as desired. Each inner and outer conduit pair receives a portion of the feed and gas entering the chambers 19, 23 and maintains the mixture as a discrete stream that is separate from the other streams of fluid mixed in the additional pairs of conduits 102, 118. It is contemplated that the liquid and gas streams may be mixed prior to entry into the distributor 15. It is also contemplated that the distributor 15 inject hydrocarbon feed into the reactor 10 without diluent, thereby obviating one of the chambers 19, 23 and the inner conduits 118.

Figure 4:
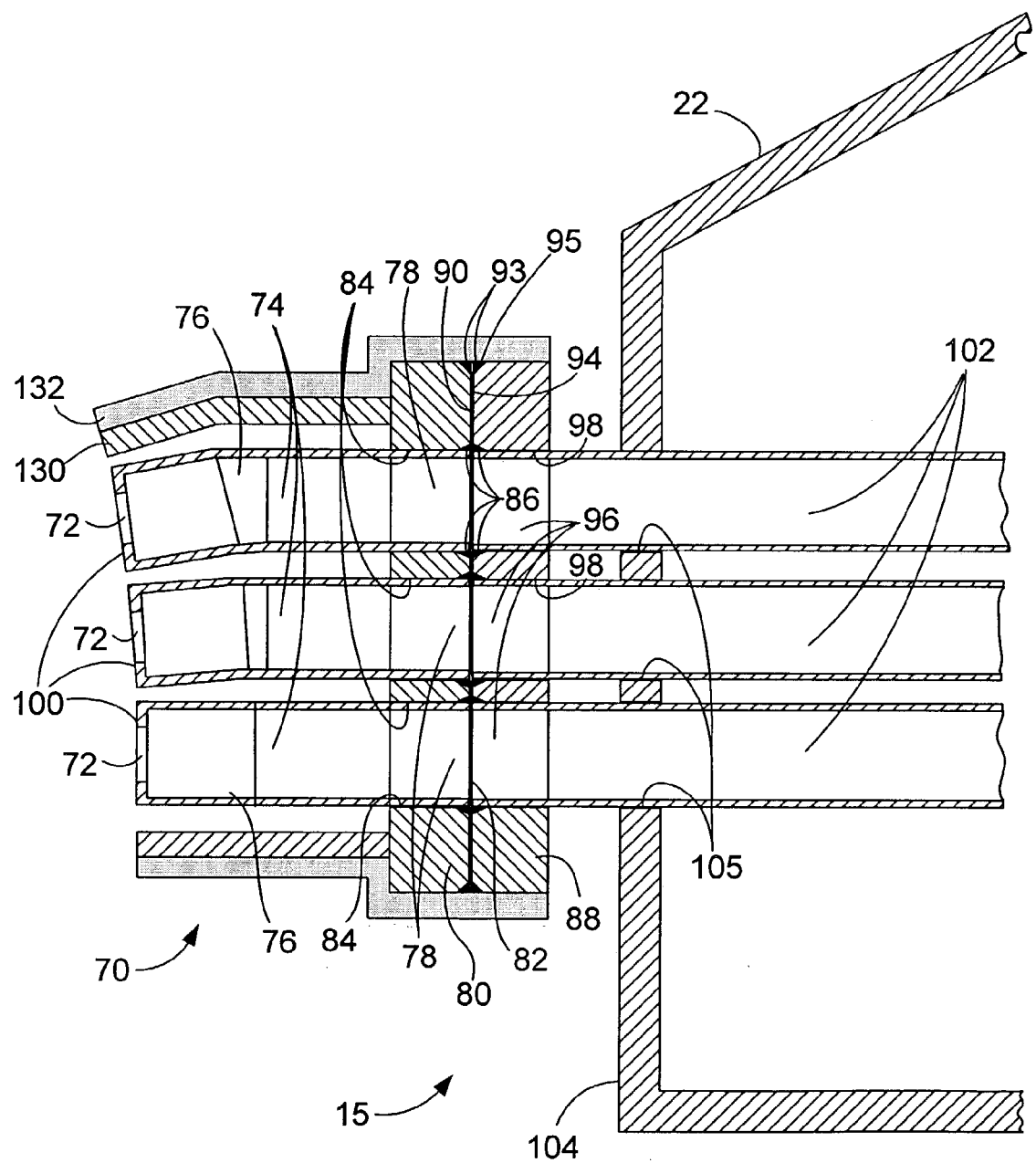
FIG. 4 is an enlarged sectional view of the view of FIG. 3.

FIG. 4 shows the distributor head 70 of the present invention. The distributor head 70 has a plurality of the nozzles 100 having openings 72 which can be slots or apertures at an outer end for injecting a plurality of uniform jets into the dispersion of moving catalyst particles within the reactor 10 (FIG. 1). The nozzles 100 may comprise an outer end 76 of outlet pipes 74. The outer ends 76 may be inclined to ensure that the jets form a desired pattern such as a fan. FIG. 4 shows three rows of the nozzles 100 and the outlet pipes 74 corresponding to three rows of the outer conduits 102. However, more or less rows may be desirable for a specific application. The two top rows of nozzles may be inclined downwardly to form converging jets with the lower row of the nozzles 100. The inner ends 78 of the outlet pipes 74 extend through the bores 84 in the tube sheet or the outer plate 80 and terminate at the inner face 82 of the outer plate 80. The outlet pipes 74 are secured or fixed to the outer plate 80 suitably such as by welding between the outer diameter of the outlet pipe 74 and the inner diameter of the bores 84. A tube sheet or an inner plate 88 has an outer face 90 secured to the inner face 82 of the outer plate 80 such as by welding. In an embodiment, the inner face 82 is welded to the outer face 90 by a perimeter weld bead 95 that surrounds the tube sheets or the plates 80, 88 and is accommodated in perimeter recesses 93 provided in the respective faces 82, 90. The inner face 82 and the outer face 90 define a seam 94. Recesses 86 in the inner face 82 and the outer face 90 facilitate and contain weld beads. Outer ends 96 of the outer conduits 102 extend through openings 105 in the outer face 104 of the shroud 22 and through bores 98 in the inner plate 88 and terminate at the outer face 90. The outer face 104 of the shroud 22 inhibits or prevents transverse displacement of the outer conduits 102 beyond the openings 105. The shroud 22 may retain the outer conduits 102. The openings 105 may be discrete holes that surround the outer conduits 102 or one or more slots that surround all or some of the outer conduits 102 to provide a sliding fit that guides the conduits to permit thermal expansion of the outer conduits 102 relative to the shroud 22. The outer ends 96 of the outer conduits 102 are secured to the inner plate 88 suitably such as by welding between the outer diameter of the outer conduit 102 and the inner diameter of the bores 98. The recesses 86 in the bores 98 may facilitate and contain weld beads. The arrangement is such that the outer conduits 102 extend from the inner plate 88 and the outlet pipes 74 extend from the outer plate 80 in opposite directions. The securement between the outer and inner plates 80, 88 along the seam 94 is fluid tight such that relatively little fluid from the outer conduits 102 enters into the seam 94 and no such fluid escapes the distributor head 70. Hence, little if any fluid in one outer conduit 102 mixes with fluid from another conduit 102.

A head shield 130 may surround the distributor head 70 to protect it from erosion. Additionally, a layer 132 of refractory may surround the head shield 130 to mitigate erosion thereof. Other parts of the distributor 15 may be layered with refractory for protective purposes, but such is not shown in the drawings. Additionally, the distributor head 70 may be retracted, so the inner plate 88 is flush with the outer face 104. Moreover, the invention contemplates the outer face 104 serving as the inner plate 88.

In the event that the nozzles 100 wear, they can be easily replaced by replacing the whole distributor head 70. Replacement is effected by breaking the securement or perimeter weld bead 95 in the perimeter recesses 93 at the seam 94 between the outer and inner plates 80, 88. The distributor head 70 comprising the nozzles 100 of the respective outlet pipes 74 fixed to the outer plate 80 is replaced with a new distributor head 70 comprising new respective nozzles 100 of the respective outlet pipes 74 fixed to a new outer plate 80. The outer plate 80 is secured to the inner plate 88 in the same fashion such as by welding, such that the outer conduits 102 communicate with the outlet pipes 74 to make a fluid-tight seal. Hence, the new distributor head 70 may operate as the replaced distributor head 70. The present invention allows replacement of all the nozzles 100 while avoiding the laborious and cumbersome procedure of securing individual nozzles 100 to the respective outlet conduits 102.

What is claimed is:

1. An apparatus for injecting a plurality of uniform jets into an extended dispersion of moving catalyst particles within a contacting vessel, said apparatus comprising:

an extended shroud having an inner end for extending out of a contacting vessel and an outer end for extending into a contacting vessel;

a plurality of outer conduits projecting into said shroud, each of said outer conduits being fixed to a respective opening in a first tube sheet, said first tube sheet being disposed outwardly of said outer end of said shroud;

a plurality of outlet nozzles each being fixed to a respective opening in a second tube sheet, said second tube sheet being fixed to said first tube sheet; and at least one conduit for supplying each of said outer conduits with a feed material.

2. The apparatus of claim 1 wherein said outer conduits extend through said outer end of said shroud.

3. The apparatus of claim 2 wherein said outer end of said shroud includes means for guiding an outer end of said outer conduits with respect to the outer end of said shroud for axial sliding movement with respect thereto.

4. The apparatus of claim 1 wherein said shroud comprises a flange for positioning said shroud in a contacting vessel.

5. The apparatus of claim 1 wherein said nozzles are arranged to discharge an essentially linear array of jets.

6. The apparatus of claim 1 wherein said shroud comprises a cylinder and the interior of said cylinder is insulated.

7. An apparatus for injecting a plurality of uniform jets into an extended dispersion of moving catalyst particles within a contacting vessel, said apparatus comprising:

a plurality of outer conduits projecting into said contacting vessel, each of said outer conduits being fixed to a respective opening in a first tube sheet;

a plurality of outlet nozzles each being fixed to a respective opening in a second tube sheet, said second tube sheet having an inner face fixed to an outer face of said first tube sheet; and at least one conduit for supplying each of said outer conduits with a fluid material.

8. The apparatus of claim 7 further including an extended shroud having an inner end for extending out of a contacting vessel and an outer end for extending into a contacting vessel.

9. The apparatus of claim 7 further including at least one additional conduit for supplying each of said outer conduits with an at least partially gas phase fluid.

* * * * *